(12) United States Patent
Hartin et al.

(10) Patent No.: US 8,234,575 B2
(45) Date of Patent: Jul. 31, 2012

(54) DYNAMIC UPDATEABLE WEB TOOLBAR

(75) Inventors: Justin W Hartin, Bellevue, WA (US); Elizabeth A Hill, Woodinville, WA (US); Michael J Miles, Duvall, WA (US); Jason E Douglass, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 703 days.

(21) Appl. No.: 11/947,800

(22) Filed: Nov. 30, 2007

(65) Prior Publication Data

US 2009/0144723 A1    Jun. 4, 2009

(51) Int. Cl.
*G06F 13/00* (2006.01)
(52) U.S. Cl. ........ 715/744; 715/745; 715/746; 715/747; 715/748; 715/749
(58) Field of Classification Search .......... 715/744–749; 705/1, 14, 26; 717/173
See application file for complete search history.

(56) References Cited

U.S. PATENT DOCUMENTS

| | | | |
|---|---|---|---|
| 5,644,737 A | 7/1997 | Tuniman et al. | |
| 6,232,972 B1* | 5/2001 | Arcuri et al. | 715/815 |
| 6,247,020 B1 | 6/2001 | Minard | |
| 6,624,831 B1* | 9/2003 | Shahine et al. | 715/815 |
| 6,784,900 B1* | 8/2004 | Dobronsky et al. | 715/744 |
| 6,925,608 B1 | 8/2005 | Neale et al. | |
| 6,925,609 B1 | 8/2005 | Lucke | |
| 6,944,829 B2 | 9/2005 | Dando | |
| 6,986,145 B2 | 1/2006 | Gangopadhyay | |
| 7,185,333 B1 | 2/2007 | Shafron | |
| 7,707,505 B1* | 4/2010 | Ohrt et al. | 715/738 |
| 2002/0057299 A1* | 5/2002 | Oren et al. | 345/825 |
| 2003/0009768 A1 | 1/2003 | Moir | |
| 2003/0050834 A1 | 3/2003 | Caplan | |
| 2003/0080995 A1 | 5/2003 | Tenenbaum et al. | |
| 2003/0140242 A1* | 7/2003 | Barton et al. | 713/200 |
| 2003/0202009 A1* | 10/2003 | Kasriel | 345/739 |
| 2004/0061720 A1* | 4/2004 | Weber | 345/760 |
| 2004/0186775 A1* | 9/2004 | Margiloff et al. | 705/14 |
| 2004/0234049 A1* | 11/2004 | Melideo | 379/88.17 |
| 2005/0039144 A1* | 2/2005 | Wada et al. | 715/840 |
| 2005/0097008 A1* | 5/2005 | Ehring et al. | 705/26 |
| 2005/0172262 A1* | 8/2005 | Lalwani | 717/109 |
| 2005/0177803 A1 | 8/2005 | Ruthfield et al. | |
| 2005/0193340 A1 | 9/2005 | Amburgey et al. | |

(Continued)

FOREIGN PATENT DOCUMENTS

KR    WO2005111846 A1    11/2005

OTHER PUBLICATIONS

"Google Toolbar", 2007 Google, pp. 1-4.

(Continued)

*Primary Examiner* — Tadeese Hailu
(74) *Attorney, Agent, or Firm* — Wolfe-SBMC

(57) ABSTRACT

A toolbar that persists in a browser window across multiple Web pages during a browsing session is displayed. This toolbar includes multiple toolbar buttons. An updated toolbar is automatically received from a remote toolbar source that is independent of the multiple Web pages, and this updated toolbar includes a change to the toolbar buttons. The toolbar in the browser is replaced, during the browsing session, with this updated toolbar. The toolbar can also include one or more buttons based at least in part on customization information regarding a user of the browser.

20 Claims, 11 Drawing Sheets

100

U.S. PATENT DOCUMENTS

| | | | |
|---|---|---|---|
| 2005/0198220 A1* | 9/2005 | Wada et al. | 709/220 |
| 2005/0228825 A1 | 10/2005 | Yang | |
| 2005/0234891 A1* | 10/2005 | Walther et al. | 707/3 |
| 2006/0059128 A1* | 3/2006 | Ruggle et al. | 707/3 |
| 2006/0095860 A1* | 5/2006 | Wada et al. | 715/771 |
| 2006/0101341 A1 | 5/2006 | Kelly et al. | |
| 2006/0123356 A1* | 6/2006 | Sobeski et al. | 715/781 |
| 2006/0155728 A1* | 7/2006 | Bosarge | 707/100 |
| 2006/0178900 A1* | 8/2006 | Shilo et al. | 705/1 |
| 2006/0190441 A1* | 8/2006 | Gross et al. | 707/3 |
| 2006/0282795 A1* | 12/2006 | Clark et al. | 715/840 |
| 2007/0016875 A1 | 1/2007 | Santos-Gomez | |
| 2007/0050722 A1 | 3/2007 | Schulz et al. | |
| 2007/0074116 A1 | 3/2007 | Thomas | |
| 2007/0136263 A1 | 6/2007 | Williams | |
| 2007/0150516 A1 | 6/2007 | Morgan et al. | |
| 2007/0157118 A1* | 7/2007 | Wuttke | 715/810 |
| 2007/0208840 A1 | 9/2007 | McConville et al. | |
| 2007/0245246 A1* | 10/2007 | Oren et al. | 715/744 |
| 2008/0005125 A1* | 1/2008 | Gaedeke | 707/10 |
| 2008/0005686 A1* | 1/2008 | Singh | 715/764 |
| 2008/0172382 A1* | 7/2008 | Prettejohn | 707/6 |
| 2009/0006974 A1* | 1/2009 | Harinarayan et al. | 715/738 |
| 2009/0132417 A1* | 5/2009 | Scipioni et al. | 705/44 |
| 2009/0150810 A1 | 6/2009 | Burroughs | |

OTHER PUBLICATIONS

"Cool features you get with Windows Live Toolbar", 2007, Microsoft, p. 1.

"Using the eBay Toolbar", eBay Inc, 1995-2007, pp. 1-2.

Tullett, "Nsauditor", 2005, SC Magazine, pp. 1-2.

Dunn., "WTL for MFC Programmers, Part III—Toolbars and Status Bars", Michael Dunn, 2003, pp. 1-10.

"StarOffice 8 Office Suite: Guide To New Features", Sep. 2005, Sun Microsystems, Inc., 2005, pp. 37.

"Non-Final Office Action", U.S. Appl. No. 11/951,459, (May 26, 2011), 15 pages.

"Restriction Requirement", U.S. Appl. No. 11/951,459, (Mar. 16, 2011), 6 pages.

"Final Office Action", U.S. Appl. No. 11/951,459, (Jan. 20, 2012), 11 pages.

"Non-Final Office Action", U.S. Appl. No. 11/951,459, (Jun. 8, 2012), 15 pages.

* cited by examiner

1100

DYNAMIC UPDATEABLE WEB TOOLBAR

BACKGROUND

Use of the Internet and the World Wide Web (or simply the Web) has become commonplace throughout the world. Typically, users of a computing device use a Web browser to access information that is made available via Web pages on the Internet. These Web pages are displayed in the Web browser, and the user can navigate to different Web pages to retrieve different information. The Web browser oftentimes includes a toolbar having different user-selectable buttons allowing the user to select different information to be displayed and/or functions to be performed. These toolbars, however, are typically installed as programs on the user's computing device (sometimes referred to as Web browser plug-ins), resulting in typically rigid toolbars requiring re-installation of the program if changes are to be made to the toolbars.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a toolbar that persists in a browser window across multiple Web pages during a browsing session is displayed. This toolbar includes multiple toolbar buttons. An updated toolbar is automatically received from a remote toolbar source that is independent of the multiple Web pages, and this updated toolbar includes a change to the toolbar buttons. The toolbar in the browser is replaced, during the browsing session, with this updated toolbar.

In accordance with one or more aspects, toolbar data is received from a remote toolbar source. The toolbar data describes toolbar buttons for a Web toolbar that is to be displayed in a Web browser window during a browsing session. Customization information regarding a user of the device is also received. The toolbar including one or more toolbar buttons based at least in part on both the toolbar data and the customization information is displayed in the Web browser.

BRIEF DESCRIPTION OF THE DRAWINGS

The same numbers are used throughout the drawings to reference like features.

DETAILED DESCRIPTION

A dynamic updateable web toolbar is discussed herein. A toolbar for a Web browser is displayed to the user of a computing device, the toolbar being received from a remote toolbar source. The toolbar includes multiple toolbar buttons, each of which is typically user-selectable and causes additional information to be displayed to the user when selected. The toolbar source can update and modify the toolbar as desired, sending a new toolbar with different toolbar buttons and/or identifying different sources of information to be displayed when a toolbar button is selected by a user. This updating of the toolbar can be accomplished without requiring the user to re-install any toolbar program or plug-in. Furthermore, the information displayed in the toolbar itself can be customized to particular users to display personally relevant information.

Figure 1:
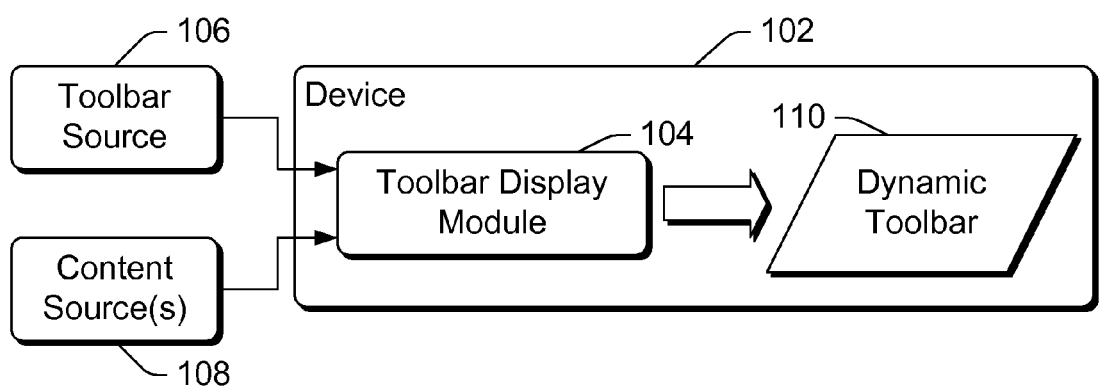
FIG. 1 illustrates an example system using the dynamic updateable web toolbar in accordance with one or more embodiments.

FIG. 1 illustrates an example system 100 using the dynamic updateable web toolbar in accordance with one or more embodiments. System 100 includes a device 102 having a toolbar display module 104, a toolbar source 106, and one or more content sources 108. Device 102 can be any of a variety of different devices that can display Web pages, such as a desktop computer, notebook computer, handheld computer, cellular phone, game console, automotive PC, and so forth.

Toolbar display module 104 receives toolbar data from toolbar source 106, which it in turn uses to display dynamic updateable toolbar 110. The toolbar data received from toolbar source 106 describes the toolbar that is to be displayed as dynamic toolbar 110. Dynamic toolbar 110 is typically displayed as part of a Web browser of device 102. Different toolbars can be received from toolbar source 106 at different times. In response to receiving a new toolbar, display module 104 changes to display the newly received toolbar. Accordingly, toolbar 110 is said to be dynamic. Furthermore, the toolbar 110 can be updated based on data received from toolbar source 106 and/or to be customized to display personally relevant information as discussed in more detail below.

It should be noted that toolbar source 106 is a remote source. In other words, toolbar source 106 is remote from device 102 and is not a component of device 102. Toolbar source 106 is typically a server accessed by device 102 via the Internet, although toolbar source 106 can alternatively be accessed in other manners. Additionally, it should be noted that toolbar source 106 is independent of any Web pages or Web page servers. Although the toolbar source may also be a source of Web pages, the delivery of the toolbar data is separate from the delivery of any Web pages. It should further be noted that toolbar source 106 can be multiple servers (e.g., different servers can provide different toolbar data).

Figure 2:
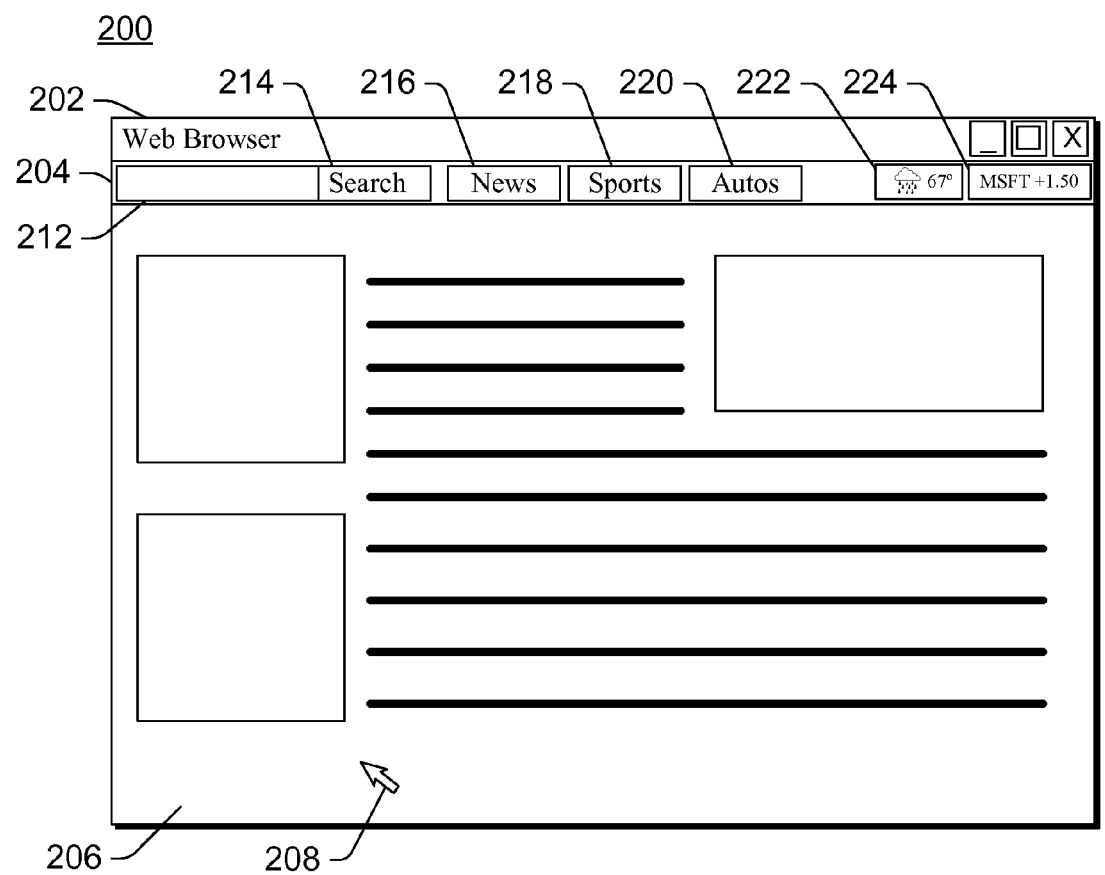
FIG. 2 illustrates an example display including a dynamic updateable web toolbar in accordance with one or more embodiments.

FIG. 2 illustrates an example display 200 including a dynamic updateable web toolbar. In display 200, a Web browser window 202 displays a web toolbar 204 and a Web page 206. Web page 206 can include any of a variety of different information, such as text (displayed as horizontal lines in Web page 206) and images (displayed as boxes in Web page 206). The display of Web page 206 is independent of the display of toolbar 204—Web page 206 and toolbar 204 are two separate components displayed by Web browser window 202.

Web browser window 202 is displayed for a particular Web browsing session. A Web browsing session (or browsing session) refers to the running of a Web browser application that displays Web browser window 202. When Web browser window 202 is displayed, the user can navigate to or surf to one or more different Web pages, and then typically closes browser window 202 which stops running the Web browser application. A new browsing session begins each time the user again runs the Web browser application. Toolbar 204 persists in Web browser window 202 across multiple Web pages during a browsing session. Although toolbar 204 persists across multiple Web pages during a browsing session, the toolbar buttons displayed in toolbar 204 can change during a browsing session (and can even during the display of a Web page), as discussed in more detail below.

Also illustrated in display 200 is a cursor 208. Cursor 208 can take any of a variety of forms and can be moved around display 200 using any of a variety of different cursor control devices. The user can move cursor 208 around window 202 and select a particular portion (e.g., one of the buttons in toolbar 204 discussed below) using the cursor control device (e.g., clicking a mouse button, pressing an "enter" or "select" button, and so forth). A particular portion can also be selected by moving a cursor over the particular portion and leaving the cursor over that particular portion for an amount of time (also referred to as "hovering"). Cursors and cursor control devices are well known to those skilled in the art and thus will not be discussed further.

Selection of a button or other portion of a toolbar being displayed is discussed herein. Such a selection can be made in any of a variety of different manners. In one or more embodiments, a selection is made using a cursor and cursor control device as discussed above. Alternatively, directional keys or a tab key can be used to cycle through different portions (e.g., different buttons in toolbar 204), and the portions can be changed (e.g., highlighted) to show when they are being selected. An "enter" key can optionally be used to select a particular one of those portions. Alternatively other selection mechanisms can be used, such as function keys, particular alphanumeric key sequences, and so forth.

Toolbar 204 includes a search box 212 and search button 214, a news button 216, a sports button 218, an autos button 220, a weather button 222, and a stock button 224. It is to be appreciated that the toolbar buttons illustrated in FIG. 2 (as well as the buttons illustrated in FIGS. 3, 5, and 6 discussed below) are only examples. The toolbar can be comprised of any set of buttons and that set of buttons can be dynamically changed over time as discussed herein.

Search box 212 is a data entry box via which a user can enter (e.g., using a keyboard or other data entry device) one or more search terms. After entry of the search term(s), the user can select button 214. Selection of button 214 causes the search terms entered in search box 212 to be communicated to a search engine (typically on a remote server accessed via the Internet), and the results of the search being displayed to the user as a new Web page 206 in browser window 202.

Each toolbar button included in toolbar 204 can have additional associated content that is displayed when the button is selected by a user. For example, news content can be displayed when news button 216 is selected, sports content can be displayed when sports button 218 is selected, and automotive content can be displayed when autos button 220 is selected. The particular content that is associated with or corresponds to each toolbar button can vary, and oftentimes does vary during a browsing session. This information is obtained from one or more content sources, as discussed in more detail below.

Some toolbar buttons, such as buttons 216, 218, and 220, display headings or information describing the additional content that is available when the button is selected. Other toolbar buttons, such as buttons 222 and 224, themselves display additional information to the user automatically and without the user having to select these buttons. For example, weather button 222 displays weather information (e.g., indicating it is currently rainy and the current temperature is 67 degrees). By way of another example, stock button 224 displays information regarding a particular stock (e.g., that the stock with the symbol MSFT is currently up +1.50 for the day).

Informational buttons 222 and 224, in addition to displaying information themselves, can also have additional associated content that is displayed when the button is selected by a user. For example, additional local and/or national weather, weather-related news stories, and so forth can be displayed when weather button 222 is selected by a user. By way of another example, additional information regarding the stock with the symbol MSFT, information regarding other stocks or the broader market, and so forth can be displayed when stock button 224 is selected.

The additional content that is displayed when a toolbar button is selected can be displayed in any of a variety of different manners. In one or more embodiments, an additional window is displayed whenever a toolbar button is selected. The additional content is displayed within this additional window.

Furthermore, the additional content that is displayed when a toolbar button is selected can be any of a variety of different types of content, such as one or more of text, images, video, audio, and so forth. The amount of content displayed as the additional content can also vary. By way of example, assume that the additional content associated with a particular button is multiple news stories. The additional content could be one or more of a summaries of the news stories, the full news stories (presented in text, video, etc.), links to where the news stories can be accessed, and so forth.

Figure 3:
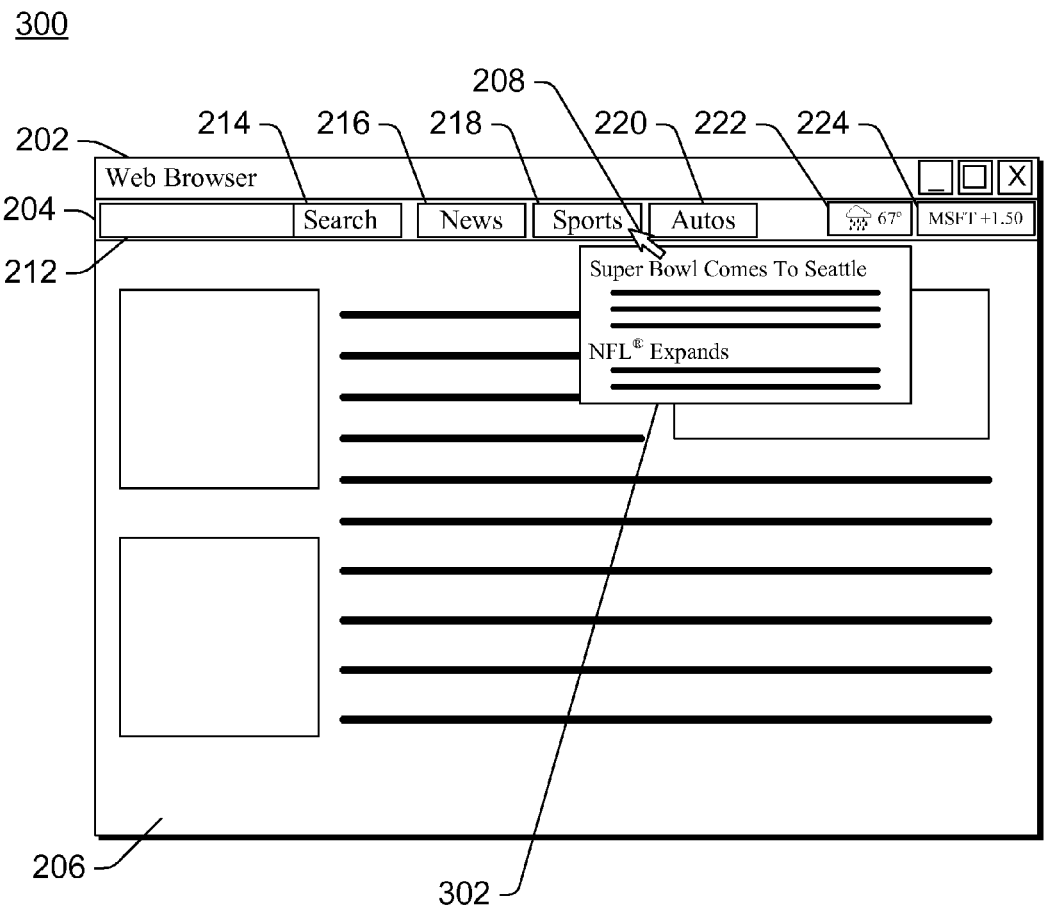
FIG. 3 illustrates an example display including an additional window in which additional content associated with a toolbar button is displayed in accordance with one or more embodiments.

FIG. 3 illustrates an example display 300 including an additional window in which additional content associated with a toolbar button is displayed. In display 300, a Web browser window 202 displays a web toolbar 204 and a Web page 206, analogous to display 200 of FIG. 2. However, in FIG. 3, sports button 218 has been selected, causing window 302 to be displayed.

Window 302 displays the additional content associated with sports button 218. In the illustrated example, window 302 displays a "Super Bowl Comes To Seattle" headline and additional text of the news story, such as a summary, the first few lines of the news story, and so forth. This additional text of the news story is displayed as horizontal lines below the "Super Bowl Comes To Seattle" headline in window 302. Window 302 also displays an "NFL® Expands" headline and additional text of the news story (shown as horizontal lines below the "NFL® Expands" headline in window 302), such as a summary, the first few lines of the news story, and so forth.

The additional content displayed in window 302 typically includes user-selectable links. Upon selection of one of the links in window 302, the Web browser retrieves and displays the Web page identified by the link as Web page 206. The user is thus able to easily view additional information regarding any of the content displayed in window 302. For example, the user could select the "NFL® Expands" headline, or the additional text of the news story displayed in window 302, and in response the Web browser retrieves and displays the entire corresponding news story as Web page 206.

It should be noted that text is displayed as the additional content in the example window 302 of FIG. 3. It is to be appreciated, however, that any of a variety of different types of content can be presented via window 302, such as one or more of images, video, audio, and so forth.

Additionally, in one or more embodiments, multiple categories or collections of content can be presented via an additional window such as window 302, each category or collection being associated with the toolbar button that was selected. These multiple categories or collections can be presented in any of a variety of different manners, such as using a series of tabs, a series of headers that can be expanded and collapsed, and so forth.

Figure 4:
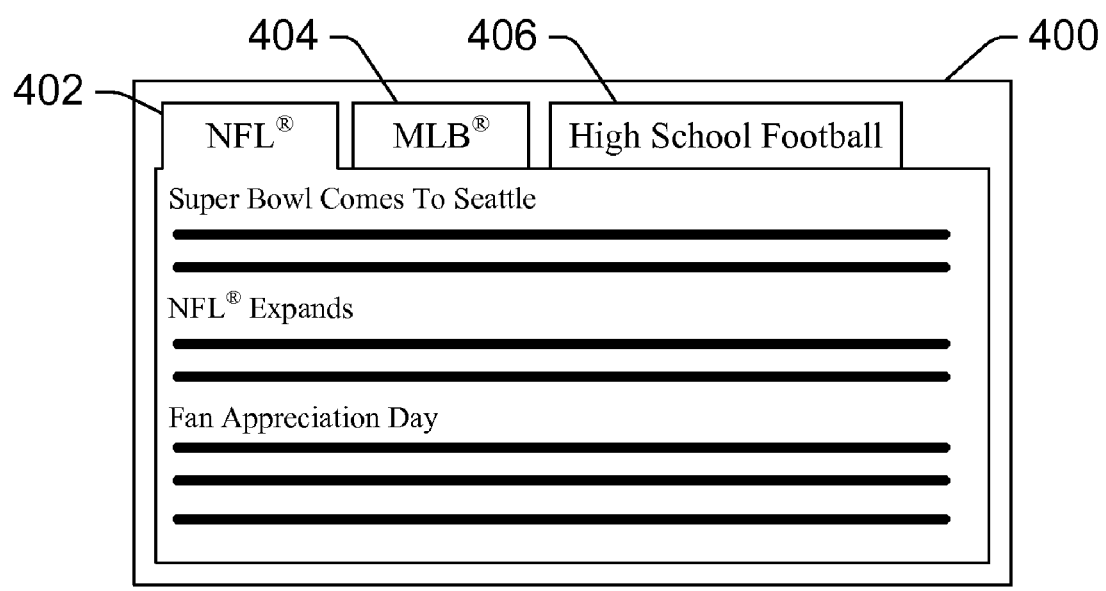
FIG. 4 illustrates an example window in which additional content associated with a toolbar button is displayed in accordance with one or more embodiments.

FIG. 4 illustrates an example window 400 in which additional content associated with a toolbar button is displayed. Window 400 is an example of the display of additional content when a toolbar button is selected. Window 400 can be, for example, a window 302 of FIG. 3.

As illustrated in window 400, the additional content is organized using different tabs 402, 404, and 406. Tab 402 includes content related to professional football (the NFL®), tab 404 includes content related to professional baseball (MLB®), and tab 406 includes content related to local high school football. The user can select any of the tabs 402, 404, and 406 in any of a variety of manners, analogous to the selection of toolbar buttons discussed above. In the illustrated example, tab 402 has been selected so that the additional content related to professional football is displayed in window 400. If tab 404 were to be selected then additional content related to professional baseball would be displayed in window 400, and if tab 406 were to be selected then additional content related to local high school football would be displayed in window 400.

Returning to FIG. 1, toolbar source 106 identifies a particular toolbar by identifying the particular buttons that are included in the toolbar. Examples of toolbar buttons were discussed above with respect to FIGS. 2 and 3, although it is to be appreciated that these are only examples. Toolbar buttons can be associated with any of a variety of different information, such as entertainment news, national and/or local news, international news, science, technology, video games, movies, books, music, travel, horoscopes, personal finance, and so forth.

In addition to the toolbar buttons themselves, one or more content sources 108 also deliver content to device 102. Content source(s) 108 deliver the additional associated content that is displayed when a toolbar button is selected. For example, the news content that is displayed when news button 216 of FIG. 2 is selected is delivered to device 102 by content source(s) 108. Content source(s) 108 also deliver the information that is displayed on an informational toolbar button. For example, the current weather conditions (rainy and 67 degrees) that are displayed as part of weather button 222 of FIG. 2 delivered to device 102 by content source(s) 108.

Toolbar source 106 and content source(s) 108 can deliver data to device 102 in any of a variety of different formats and following any of a variety of different protocols. In one or more embodiments, the toolbars are delivered as extensible markup language (XML) or extensible application markup language (XAML) data (e.g., XML or XAML files). Additionally, in one or more embodiments the content delivered by content source(s) 108 are delivered as RSS feeds, also referred to as web feeds or channels. RSS feeds refer to, for example, Really Simple Syndication feeds, RDF Site Summary feeds, or Rich Site Summary feeds. Different RSS feeds can be subscribed to by device 102 to obtain the content from source(s) 108.

It is to be appreciated that XML, XAML, and RSS feeds are only examples of formats and/or protocols that can be used to deliver toolbars by toolbar source 106 and/or content by content source(s) 108. Any of a variety of other formats and/or protocols could be used, such as any of a variety of public and/or proprietary markup language formats, any of a variety of other public and/or proprietary non-markup language formats, Atom feeds, application programming interface (API) calls, and so forth.

In one or more embodiments, toolbar source 106 identifies, along with an identification of the toolbar buttons to be displayed in the toolbar, the RSS feeds to be subscribed to for the additional content to be displayed when one of those toolbar buttons is selected. Thus, toolbar source 106 identifies both the buttons to be displayed in the toolbar and the content source(s) 108 for the additional content associated with those toolbar buttons.

Thus, it can be seen that the toolbar buttons themselves, as well as the additional content displayed when a toolbar button is selected can be easily changed during a browsing session and even during display of a particular web page. New data describing a toolbar button and/or the additional content to be displayed when the button is selected can be sent to the toolbar display module, and the display of the toolbar can be updated to reflect this new data. No re-installation of any program or browser plug-in need be performed in order for this new data to be displayed to the user. Furthermore, the toolbar is changed automatically, and this change is driven by the toolbar data received from toolbar source 106 and the additional content received from content source(s) 108. The change is automatic—the user need not enter any specific request for the change to be made, and need not notify toolbar source 106 and/or content source(s) 108 of what changes he or she would like made.

The dynamic updateable web toolbar discussed herein can also be used to display alerts regarding the toolbar buttons. One example of displaying such an alert is displaying an alert when a news story that people may perceive as being important becomes available, oftentimes referred to as "breaking news". The toolbar can be used to identify such alerts to the user, such as by changing the appearance of the toolbar button, by displaying a headline describing the alert, and so forth. These alerts can be associated with different news stories and/or different events specific to a particular toolbar button, or alternatively a new button can be created to display the alert. For example, the toolbar can be used to alert the user to breaking news via the news button (e.g., button 216 of FIG. 2), or via creating a new button labeled with the text "NEW". By way of another example, the toolbar can be used to alert the user to a new high temperature for the day or a change in the weather via the weather button (e.g., button 222 of FIG. 2). By way of yet another example, the toolbar can be used to alert the user to a new daily high for a stock price (e.g., button 224 of FIG. 2).

The way in which the toolbar button is used to identify such an alert to the user can vary. In one or more embodiments, the appearance of the toolbar button is changed to identify the alert. This appearance can be a change in color of the button and/or text in the button, a change in the font size or type of the text in the button, a change in a border surrounding the button (e.g., changing color, changing design, changing to a flashing border, etc.), animation of the image or text in the button and/or border of the button, and so forth.

In other embodiments, information describing the content of the alert is displayed in the toolbar. This information can replace the information in the toolbar button, such as replacing the text "news" in news button 216 of FIG. 2 with text of a breaking news headline or with an image from the news event. Alternatively, this information can be displayed on the toolbar in addition to the toolbar button. For example, the breaking headline news can be displayed in the toolbar along with news button 216 of FIG. 2.

Figure 5:
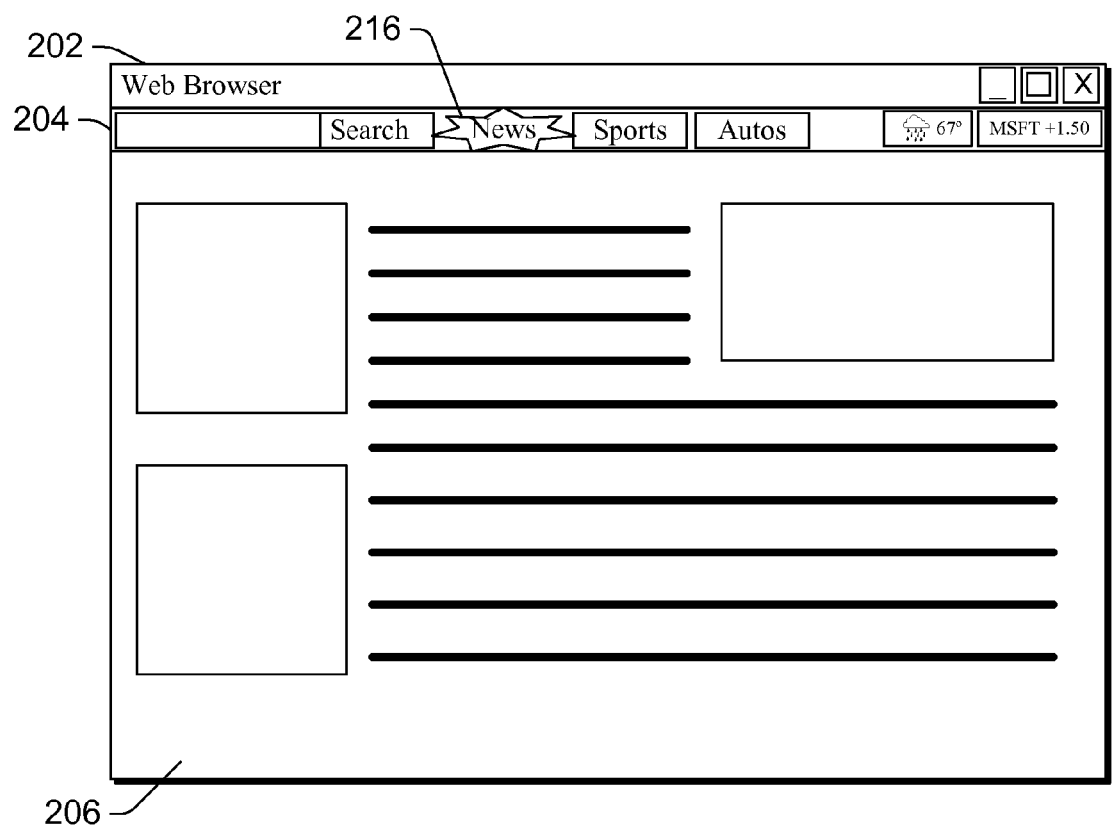
FIG. 5 illustrates an example display including a toolbar with an altered toolbar button to identify an alert in accordance with one or more embodiments.

FIG. 5 illustrates an example display 500 including a toolbar with an altered toolbar button to identify an alert. In display 500, a Web browser window 202 displays a web toolbar 204 and a Web page 206, analogous to display 200 of FIG. 2. Additional toolbar buttons, analogous to display 200 of FIG. 2, are also displayed.

However, in FIG. 5, the appearance of news button 216 is changed to identify an alert (e.g., a breaking news story). In the example of FIG. 5, the appearance of news button 216 is changed by altering a border around news button 216. This alteration of the border is an example. As discussed above, the appearance of news button 216 can alternatively be changed in different manners to identify the alert (e.g., animation of the button, change in color of the button, change in the information in the button, and so forth). In one or more embodiments, selection of news button 216 causes a window to open up (analogous to window 302 of FIG. 3) in which the breaking news story is displayed. Alternatively, when news button 216 identifies an alert, selection of news button 216 could cause the Web browser to retrieve and display a Web page including the breaking news story as Web page 206.

Figure 6:
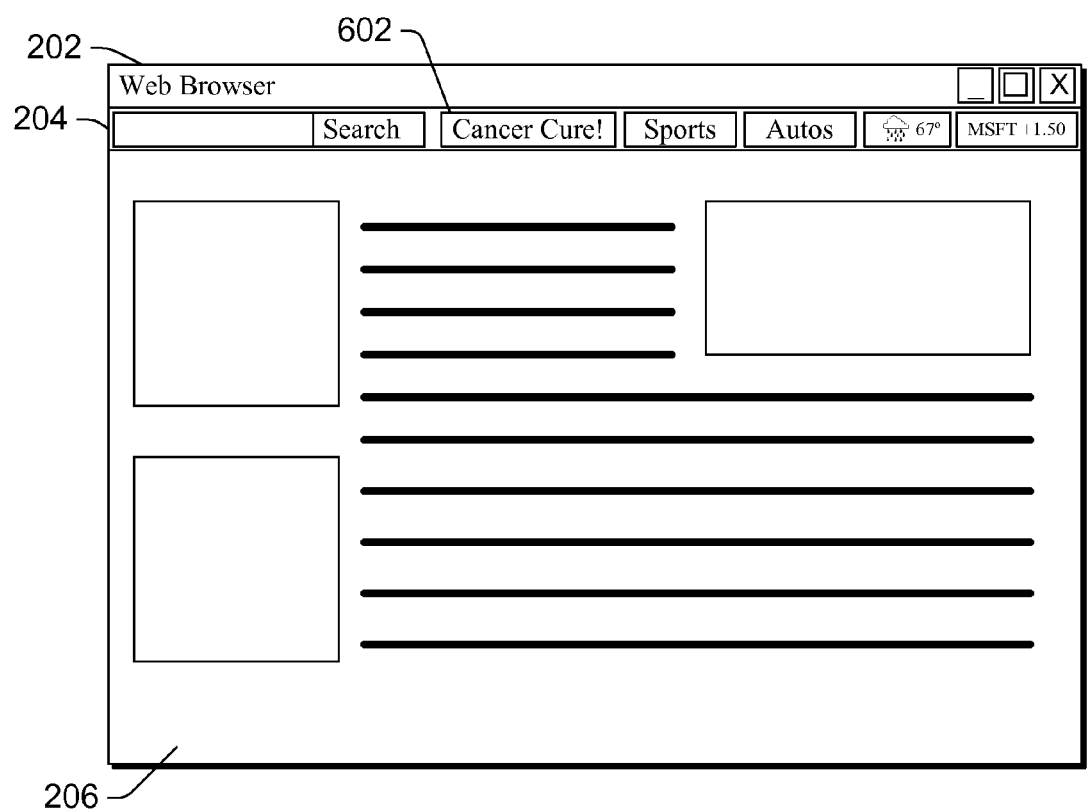
FIG. 6 illustrates an example display including a toolbar displaying a headline to identify an alert in accordance with one or more embodiments.

FIG. 6 illustrates an example display 600 including a toolbar displaying a headline to identify an alert. In display 600, a Web browser window 202 displays a web toolbar 204 and a Web page 206, analogous to display 200 of FIG. 2. Additional toolbar buttons, analogous to display 200 of FIG. 2, are also displayed.

However, in FIG. 6, information describing the alert is displayed in toolbar 204. In the example of FIG. 6, the alert is a breaking news story regarding a new cure for cancer. The news button 216 is replaced with an alert button 602 including the "Cancer Cure!" headline. Although FIG. 6 illustrates the "Cancer Cure!" headline replacing the "News" text of news button 216, in alternative embodiments the "Cancer Cure!" headline could be separate from the news button 216. In such alternate embodiments, a new toolbar button displaying the text "Cancer Cure!" could be displayed in toolbar 204.

Returning to FIG. 1, dynamic toolbar 110 can optionally be customized to particular users of device 102. In one or more embodiments this customization is performed by toolbar display module 104 and/or toolbar source 106, although in other embodiments this customization can be performed by other components and/or modules. This customization allows different toolbar buttons and/or additional content displayed when a toolbar button is selected to be different for different users (whether different of the same device 102 or users of different devices 102). The customization allows personally relevant information to be displayed on a user-by-user basis via the toolbar.

The customization can be performed in any of a variety of different manners. In one or more embodiments, the customization is based on customization information, such as a current user context, past user behavior, and/or user-specified information.

The current context of the user refers to any information regarding the user's current web access. This can include information regarding the Web pages being accessed by the user, such as the Web page the user is currently viewing, the Web pages the user has viewed during the current browsing session and/or during a preceding amount of time (e.g., during the last 30 minutes), and so forth. This can also include information regarding the user's current location, such as can be derived based on the Internet Protocol (IP) address of device 102, global positioning system (GPS) coordinates describing the location of device 102, and so forth. This can further include information regarding the current date, the current time, and so forth.

The current context of the user can be analyzed using any of a variety of different rules and/or criteria to determine what toolbar buttons are to be displayed to the user and/or what additional content is to be presented to the user when a toolbar button is selected. For example, the toolbar can be customized so that a stock button is displayed only when the stock market is open. By way of another example, a weather button with the current weather for the user's current location can be displayed. By way of yet another example, if the user is currently viewing a Web page for a professional football team, then a sports button and/or football button can be included in the toolbar.

The user's past behavior can also be used to customize the toolbar. The user's past behavior refers to any information regarding the user's past web accesses. This is similar to the user's context discussed above, but instead of referring to a user's current web access, the user's past behavior refers to his or her past web accesses. These past web accesses can be, for example, past web browsing sessions. Information describing the user's web accesses is monitored and maintained for use in subsequent customization. This information can include, for example, Web pages accessed, the type of information included in Web pages accessed (e.g., history information, personal finance information, global news, and so forth), the duration that particular Web pages were being displayed, dates and/or times of accesses to Web pages, and so forth.

The user's past behavior can be analyzed using any of a variety of different rules and/or criteria to determine what toolbar buttons are to be displayed to the user and/or what additional content is to be presented to the user when a toolbar button is selected. For example, the toolbar can be customized so that an autos button is displayed if the user previously accessed at least a threshold number of Web pages describing cars, but customized so that an autos button is not displayed if the user did not previously access at least the threshold number of Web pages describing cars. By way of another example, a weather button with the current weather for the user's current location can be displayed only if the user frequently accesses a Web page including a weather forecast. Frequent access can be determined by a threshold number of accesses (optionally within a particular amount of time or relative to a total number of Web pages accessed), a particular pattern of access (e.g., every morning, every evening, etc.), an amount of time the Web page was displayed, and so forth. By way of yet another example, if the user frequently accesses a Web page for a professional football team, then a football button (or a button for that particular professional football team) can be included in the toolbar, or a sports button listing the score of the most recent game that football team played in.

User-specified information can also be used to customize the toolbar. The context and behavior information discussed above are obtained primarily by monitoring and/or analyzing the user's actions. The user-specified information, on the other hand, is information that is specifically identified by the user. For example, the user may set a preference or configuration option indicating his or her desired language, his or her location (e.g., GPS coordinates, zip code, etc.), his or her favorite sports teams, his or her favorite stocks, and so forth. This allows the toolbar to be customized to create a more personally relevant toolbar for the user.

For example, the toolbar can be customized to include a team button for the user's favorite sports team. By way of another example, the toolbar can be customized to include a weather button displaying the current weather for the user's location (or for whatever location the user entered). By way of yet another example, the toolbar can be customized to include breaking news alerts for national breaking news (but not for local breaking news and not for international breaking news).

Figure 7:
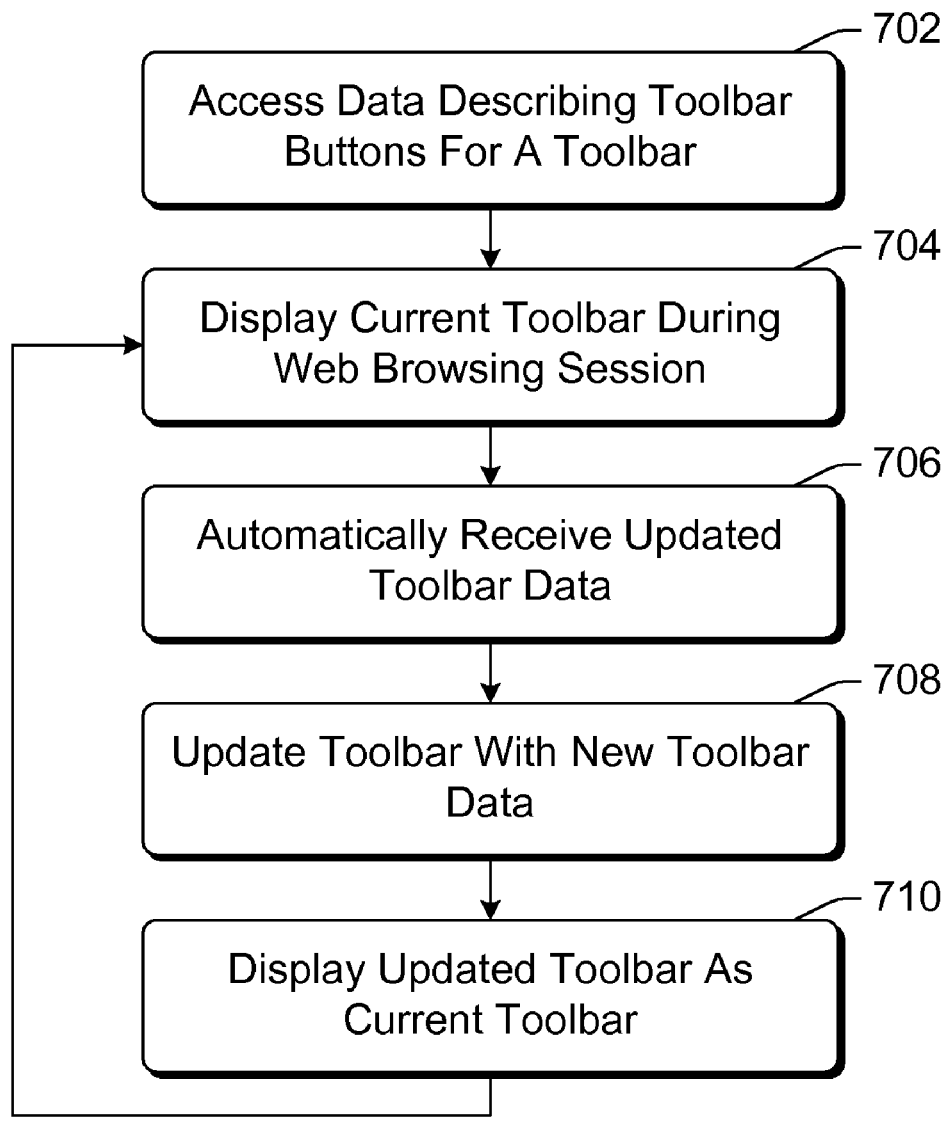
FIG. 7 is a flowchart illustrating an example process for updating a Web toolbar in accordance with one or more embodiments.

FIG. 7 is a flowchart illustrating an example process 700 for updating a Web toolbar. Process 700 can be implemented in software, firmware and/or hardware. Process 700 is carried out by a toolbar display module, such as module 104 of FIG. 1.

Initially, data describing the toolbar buttons to be included in a toolbar is accessed (act 702). This data can be, for example, an XML or XAML document as discussed above. In one or more embodiments, this data also describes where to obtain (e.g., particular RSS feeds) the content associated with the toolbar buttons that is displayed when one of the toolbar buttons is selected.

A current toolbar is displayed during a web browsing session (act 704) on a device. This current toolbar data includes the toolbar buttons identified in the data accessed in act 702. At some later point, updated toolbar data is automatically received (act 706). The receipt of the updated toolbar data is automatic—the user need not enter any specific request for the toolbar to be updated and need not notify toolbar source 106 and/or content source(s) 108 of what changes he or she would like made to the toolbar.

The updated toolbar data describes the new toolbar that is to be displayed on the device. In one or more embodiments, this updated toolbar data is a standalone description of a toolbar. This standalone description identifies the toolbar buttons to display in the toolbar without reference to any previous toolbar. Alternatively, this updated toolbar data describes changes to make to a previous toolbar (e.g., the current toolbar being displayed in act 704). These changes can be, for example, an additional button(s) to display, a button(s) that is no longer to be displayed, a change to a button(s) (e.g., to identify an alert), a change in RSS feed for the additional content for a button, and so forth.

The toolbar is then updated with the new toolbar data (act 708), and the updated toolbar is displayed as the current toolbar (act 710). This new current toolbar is then displayed as the current toolbar during the browsing session until new updated toolbar data is received.

It should be noted that process 700 can occur during a single browsing session. In other words, the toolbar is automatically updated during the user's web browsing session. The user need not interrupt his or her web browsing to initiate the toolbar update. Rather, it is done automatically without requiring user input.

It should also be noted that the toolbars displayed in process 700 can also be customized with personally relevant information. The toolbar data accessed or received in acts 702 and 706 can already incorporate this customization, or alternatively the customization can occur after the device receives or accesses the toolbar data. In one or more embodiments, the received or accessed toolbar data is the initial toolbar data which is subsequently customized with personally relevant information. The customization can, for example, identify one or more buttons from the initial toolbar data that are to be removed from or added to the toolbar, identify colors and/or fonts to use in the toolbar, and so forth.

Figure 8:
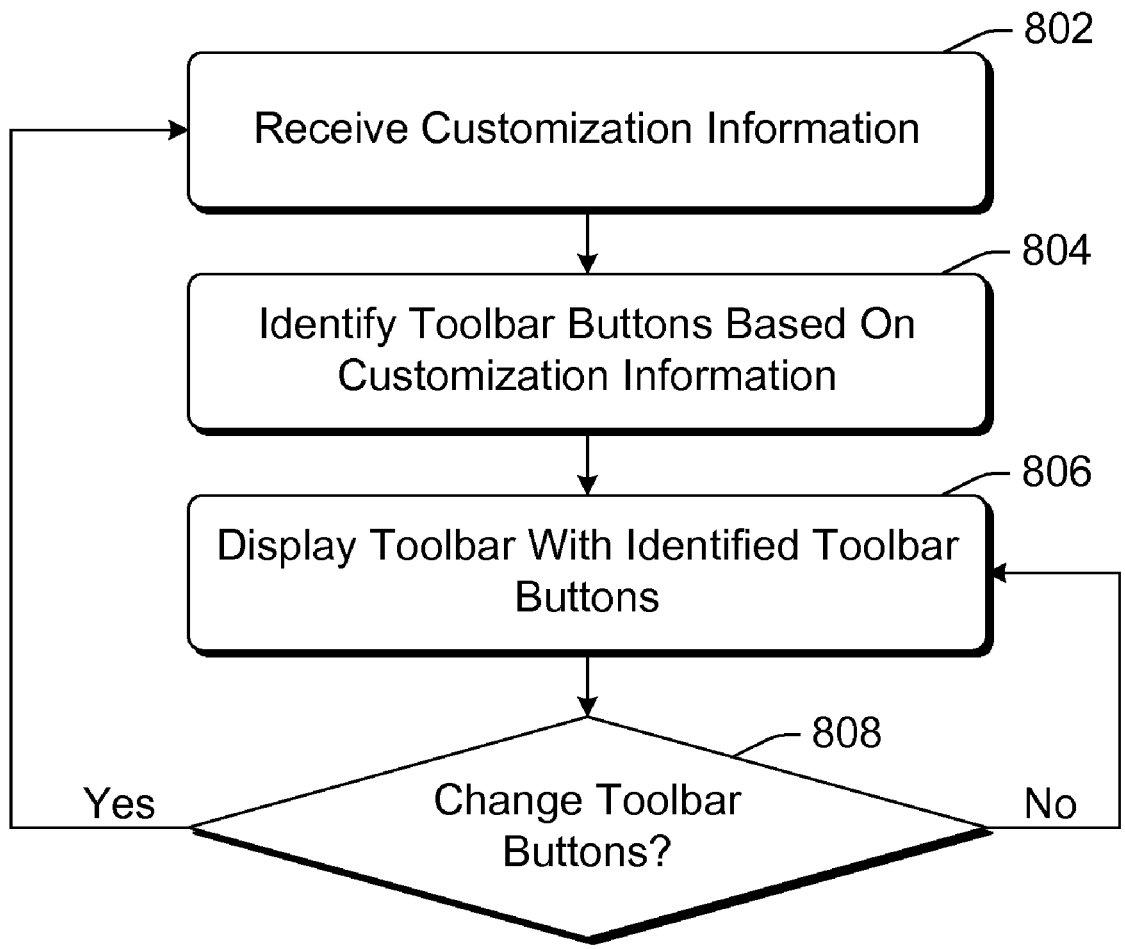
FIG. 8 is a flowchart illustrating an example process for customizing a toolbar with personally relevant information in accordance with one or more embodiments.

FIG. 8 is a flowchart illustrating an example process 800 for customizing a toolbar with personally relevant information. Process 800 can be implemented in software, firmware and/or hardware. In one or more embodiments, process 800 is carried out by a toolbar display module, such as module 104 of FIG. 1. Alternatively, process 800 can be carried out by a toolbar source, such as toolbar source 106 of FIG. 1, or alternatively another customization component located on the same device as the toolbar display module or alternatively located on a separate device.

Initially, customization information regarding a user of the device displaying the toolbar is received (act 802). This customization information can be, for example, user context information, user behavior information, and/or user-specified information as discussed above. One or more toolbar buttons are identified based on the customization information (act 804). These toolbar buttons are identified, for example, by using the customization information and any of a variety of different rules and/or criteria as discussed above.

The toolbar is then displayed with the toolbar buttons identified in act 804 (act 806). This toolbar continues to be displayed until a change in toolbar buttons is detected (act 808). Once the change in toolbar buttons is detected, process 800 returns to receive the customization information to identify new toolbar buttons.

The change in toolbar buttons can be detected in act 808 in any of a variety of manners. In one or more embodiments, the current user context is monitored and when a change (or a change exceeding a threshold amount) occurs, then it signifies a change in toolbar buttons. Alternatively, a change in toolbar buttons could also be detected in other manners, such as received from a remote toolbar source. Additionally, it should be noted that the change in toolbar buttons detected in act 808 optionally includes an indication of what changes are to be made to the toolbar. In such situations, acts 802 and 804 need not be repeated, and the new toolbar can be displayed based on the changes indicated along with the toolbar button change being detected.

Figure 9:
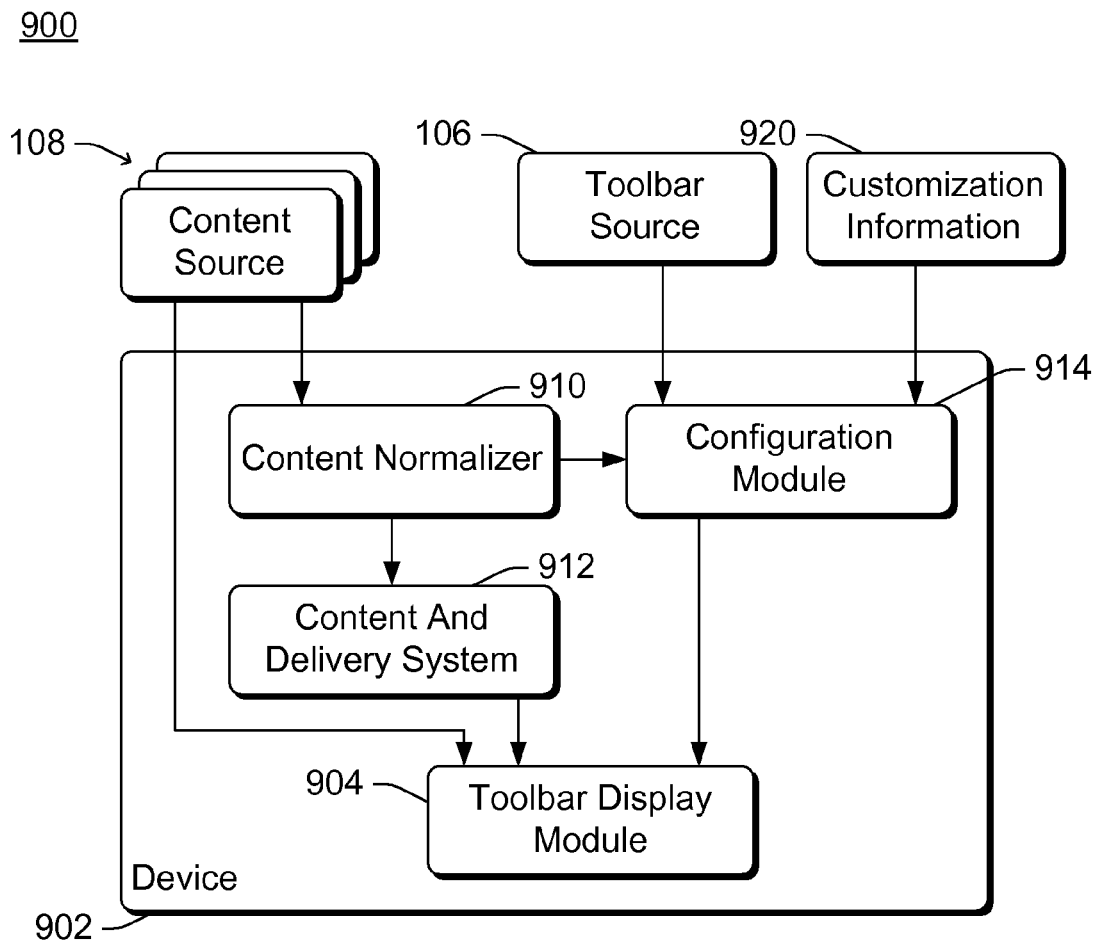
FIG. 9 is a block diagram illustrating an example system implementing the dynamic updateable web toolbar in accordance with one or more embodiments.

FIG. 9 is a block diagram illustrating an example system 900 implementing the dynamic updateable web toolbar discussed herein. System 900 includes a device 902 and toolbar display module 904. Device 902 can be device 102 of FIG. 1, and toolbar display module 904 can be toolbar display module 104 of FIG. 1. In one or more embodiments, toolbar display module 904 is implemented as part of a Web browser application (not shown) on device 902.

Device 902 receives content from one or more content source(s) 108, and toolbar data from a remote toolbar source 106, analogous to the discussion above. Different content sources 108 can deliver data in different formats, some of which are understood by toolbar display module 904 and some of which are not. Data from content source(s) 108 that is in a format understood by toolbar display module 904 is delivered to toolbar display module 904. Data from content sources 108 in different formats are delivered to content normalizer 910. Content normalizer 910 converts the delivered content to a format understood by toolbar display module 904.

Additionally, some of the data received from content source(s) 108 can include references or links to images or other data. When the received data includes such references or links, a content and delivery system 912 identifies these references and links and obtains the referenced or linked-to data from their source. The source of such referenced or linked-to data is typically identified in the reference or the link, but alternatively can be identified in different manners, such as being a default source known to system 912 or being stored in a known location. Once obtained, the referenced or linked-to data is combined with the data received from the content source(s) 108, and is delivered to toolbar display module 904.

Device 902 also includes a configuration module 914. Configuration module 914 identifies the format for the toolbar to be displayed by toolbar display module 904. This format can include an indication of which toolbar buttons are to be included in the toolbar, as indicated by toolbar source 106. This format can also include any of a variety of customization information 920, which can be obtained from a source local to device 902 and/or a source remote from device 902.

In one or more embodiments where the toolbar is customized at device 902 to display personally relevant information as discussed above, this customization can be performed by configuration module 914. Alternatively, the toolbar displayed by toolbar display module 904 can be customized to display personally relevant information by obtaining content from a customized content source 108. This customized content source maintains identifiers of the customized information that is to be displayed as part of the customized toolbar, and delivers this information to toolbar display module 904. In such embodiments, configuration module 914 need not perform any customization of the toolbar to display personally relevant information. For example, a customized content source 108 can maintain a record of the location of device 902 and deliver customized information based on that location to device 902, such as local weather content, local news content, and so forth.

Figure 10:
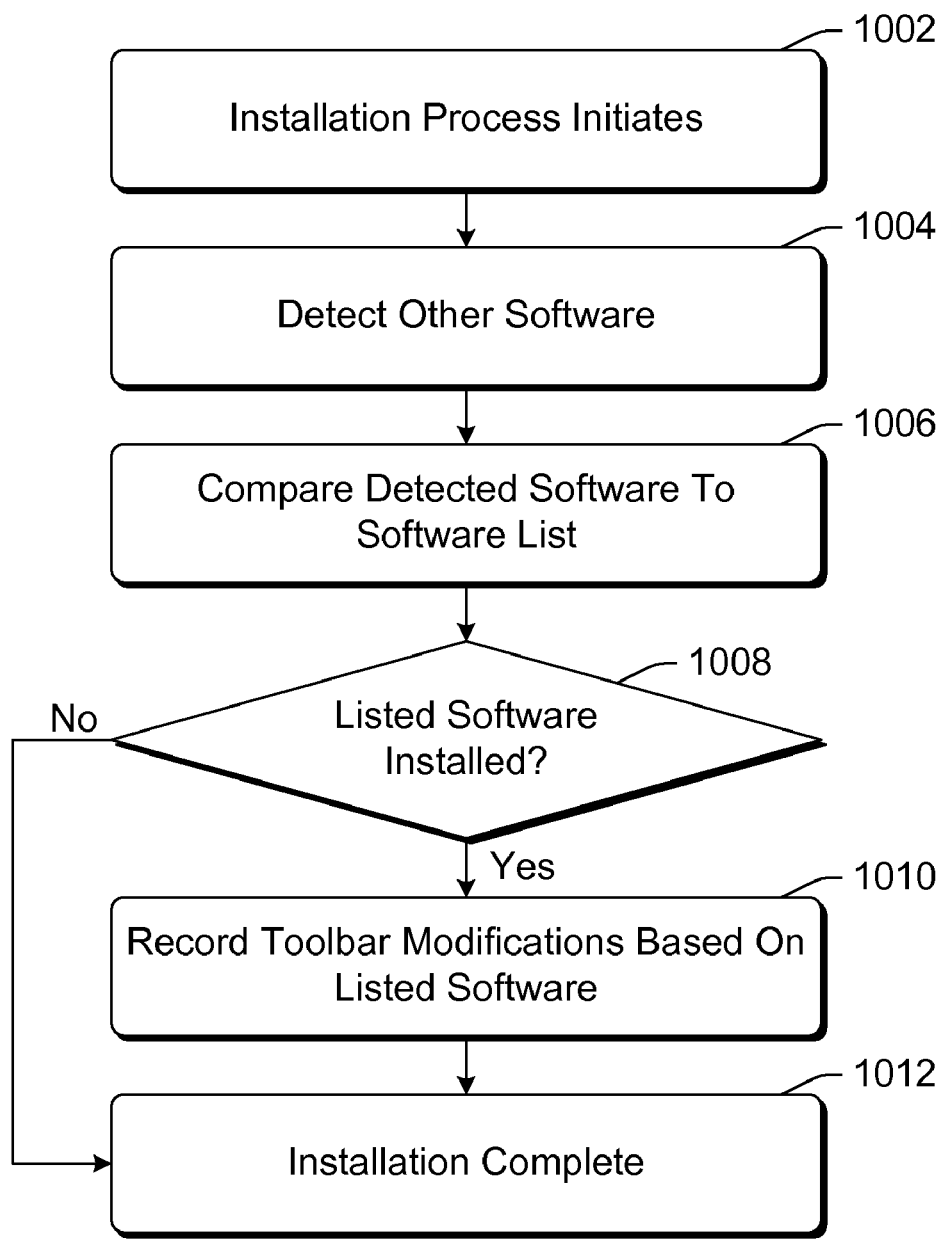
FIG. 10 is a flowchart illustrating an example process for initializing a device to use the dynamic updateable web toolbar in accordance with one or more embodiments.

FIG. 10 is a flowchart illustrating an example process 1000 for initializing a device to use the dynamic updateable web toolbar in accordance with one or more embodiments. Process 1000 can be implemented in software, firmware and/or hardware.

Initially, the installation process begins (act 1002). As part of the installation process, other software previously installed on the device is detected (act 1004). This detection can be performed in any of a variety of manners, such as requesting identification of the previously installed software from an operating system of the device, accessing a known location where a record of the previously installed software is maintained (e.g., an operating system registry), and so forth.

The detected software is then compared to a software list (act 1006), and a determination is made as to whether any of the software identified in the software list is installed on the device (act 1008). The software identified in the software list can be any of a variety of different software, such as an operating system, a Web browser, a Web browser plug-in (e.g., another toolbar), and so forth. If any software in the list is installed on the device, then a record of the modifications to make to the toolbar based on the software in the software list that is installed on the device (act 1010). This record can be maintained, for example, by configuration module 914 of FIG. 9 so that the toolbars displayed by the toolbar display module can incorporate these modifications.

The modifications that are made to the toolbar can vary based on the particular software from the software list that is installed on the device. Typically, these modifications are modifications to create a more user-friendly and/or more appealing toolbar. For example, if a search button and search data input box are already displayed by another component or module installed on the device that is displayed when the web browser application is run, then a search button and search data input box need not be included in the toolbar displayed by the toolbar display module. By way of another example, different operating systems on the device may support different fonts, so a record of which fonts to use for the toolbar is maintained so that the toolbar display module attempts to display only fonts supported by the operating system of the device.

After the toolbar modifications have been recorded, or if no software in the software list has been installed on the device, then installation is complete (act 1012).

Figure 11:
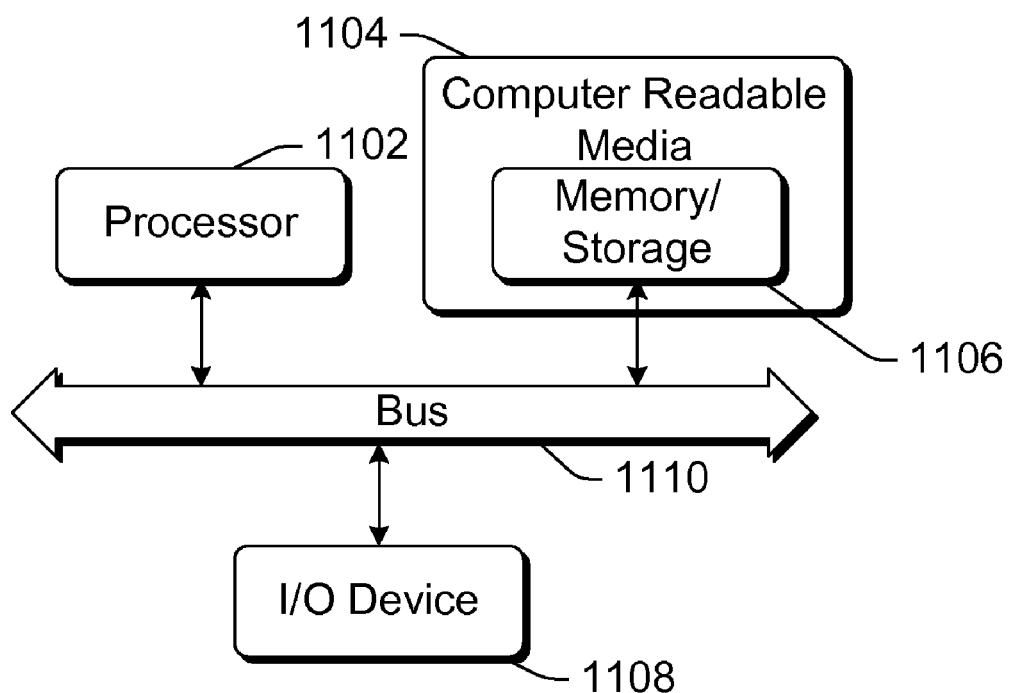
FIG. 11 illustrates an example computing device that can be configured to implement the dynamic updateable web toolbar in accordance with one or more embodiments.

FIG. 11 illustrates an example computing device 1100 that can be configured to implement the dynamic updateable web toolbar in accordance with one or more embodiments. Computing device 1100 can implement any of the techniques and processes discussed herein.

Computing device 1100 includes one or more processors or processing units 1102, one or more computer readable media 1104 which can include one or more memory and/or storage components 1106, one or more input/output (I/O) devices 1108, and a bus 1110 that allows the various components and devices to communicate with one another. Computer readable media 1104 and/or I/O device(s) 1108 can be included as part of, or alternatively may be coupled to, computing device 1100. Bus 1110 represents one or more of any of several types of bus structures, including a memory bus or memory controller, a peripheral bus, an accelerated graphics port, and a processor or local bus using any of a variety of bus architectures. Bus 1110 can include wired and/or wireless buses.

Memory/storage component 1106 represents one or more computer storage media. Component 1106 can include volatile media (such as random access memory (RAM)) and/or nonvolatile media (such as read only memory (ROM), Flash memory, optical disks, magnetic disks, and so forth). Component 1106 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit 1102. It is to be appreciated that different instructions can be stored in different components of computing device 1100, such as in processing unit 1102, in various cache memories of processing unit 1102, in other cache memories of device 1100 (not shown), on other computer readable media, and so forth. Additionally, it is to be appreciated that the location where instructions are stored in computing device 1100 can change over time.

One or more input/output devices 1108 allow a user to enter commands and information to computing device 1100, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Additionally, it should be noted that in one or more embodiments the advertisement-controlled Web page customization techniques discussed herein can be implemented in hardware. For example, one or more logic circuits, application-specific integrated circuits (ASICs), programmable logic devices (PLDs), and so forth can be created and/or configured to implement the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    displaying a toolbar that persists in a browser window displayed on a device across multiple Web pages during a browsing session, the toolbar including multiple toolbar buttons, wherein displaying the toolbar comprises customizing the toolbar to display personally relevant information based, at least in part, on information other than information associated with a web page currently displaying;
    automatically receiving during the browsing session and without requiring user input, from a remote toolbar source independent of the multiple Web pages, an updated toolbar including a change to the multiple toolbar buttons;
    customizing at least a portion of the updated toolbar utilizing customization information provided by a different remote source than the remote toolbar source, the customization information comprising information that is not user-specified; and
    replacing, during the browsing session, at least a first portion of the toolbar in the browser window with the customized portion of the updated toolbar.

2. A method as recited in claim 1, further comprising:
    receiving a selection of one of the multiple toolbar buttons; and
    displaying, in response to receiving the selection and in an additional window, additional content associated with the one toolbar button.

3. A method as recited in claim 2, wherein displaying the additional content comprises:
    displaying the additional window including multiple tabs, each tab identifying a different one of multiple categories associated with the one toolbar button;
    receiving a selection of one of the multiple tabs; and
    displaying, in response to receiving the selection of the one tab, additional content in a category of the multiple categories corresponding to the one tab.

4. A method as recited in claim 1, wherein replacing the toolbar in the browser window comprises replacing the toolbar in the browser window with the customized updated toolbar without requiring any toolbar component to be reinstalled on the device.

5. A method as recited in claim 1, wherein the change to the multiple toolbar buttons includes a change in an appearance of one of the multiple toolbar buttons to identify an alert regarding the one toolbar button.

6. A method as recited in claim 5, wherein to change the appearance of the one toolbar button is to replace text of the one toolbar button with text of a breaking news headline.

7. A method as recited in claim 1, wherein the personally relevant information comprises information based on a current user context.

8. A method as recited in claim 1, wherein the personally relevant information comprises information based on past user behavior.

9. A method as recited in claim 1, wherein the personally relevant information comprises information based on user-specified information.

10. A method as recited in claim 1, further comprising:
    detecting other software installed on the device;
    recording one or more changes to make to the toolbar based at least in part on the software installed on the device; and
    wherein displaying the toolbar comprises displaying the toolbar incorporating the one or more changes.

11. A method as recited in claim 10, wherein the other software comprises another toolbar that is displayed in the browser window.

12. A method as recited in claim 1, wherein automatically receiving the updated toolbar comprises automatically receiving XML data describing the change to the multiple toolbar buttons, the method further comprising receiving one or more RSS feeds identifying additional content associated with each of the multiple toolbar buttons.

13. One or more computer storage media having stored thereon multiple instructions that, when executed by one or more processors of a device, causes the one or more processors to:
    receive toolbar data from a remote toolbar source, the toolbar data describing toolbar buttons for a Web toolbar to be displayed in a Web browser window during a browsing session;
    receive customization information regarding a user of the device based, at least in part, on information other than information associated with a web page currently displaying, wherein at least some of the customization information regarding a user of the device is received from a source local to the device and at least some of the customization information is received from a customization source remote to the device, the remote customization source comprising a different source than the remote toolbar source; and display the toolbar in the Web browser, the toolbar including one or more toolbar buttons based at least in part on both the toolbar data and the customization information, the one or more toolbar buttons configured to be automatically changed during display of the web page without requiring user input.

14. One or more computer storage media as recited in claim 13, wherein the instructions further cause the one or more processors to:

display a new toolbar based on new toolbar data automatically received from a remote toolbar source that is independent of Web pages being displayed by the Web browser.

15. One or more computer storage media as recited in claim 14, wherein the new toolbar data includes an indication of a change in appearance of one of the one or more toolbar buttons to identify an alert regarding the one toolbar button.

16. One or more computer storage media as recited in claim 13, wherein the customization information comprises, for the user, a current user context, past user behavior, and user-specified information.

17. A computing device comprising:
a processor; and
one or more computer readable media storing multiple instructions for execution by the processor, the multiple instructions causing the processor to:
  access data describing multiple toolbar buttons to be included in a toolbar;
  display the toolbar in a Web browser window, the toolbar including the multiple toolbar buttons, wherein display of the toolbar comprises customizing the toolbar to display personally relevant information based, at least in part, on information other than information associated with a web page currently displaying, wherein the information other than information associated with a web page currently displaying comprises user-specified preferences and information obtained from analyzing user Web browser activity received from a different remote source than a remote toolbar source;
  receive, from the remote toolbar source, new data describing a change to the multiple toolbar buttons; and
  replace automatically during a browsing session associated with the Web browser the display of the toolbar in the Web browser window with an updated toolbar, the updated toolbar incorporating the change to the multiple toolbar buttons.

18. A computing device as recited in claim 17, the multiple instructions further causing the processor to:
receive a user selection of one of the multiple toolbar buttons;
display, in response to receiving the user selection of the one button, an additional window including multiple tabs, each tab identifying a different one of multiple categories associated with the one toolbar button;
receive a user selection of one of the multiple tabs; and
display, in response to receipt of the user selection of the one tab, additional content in a category of the multiple categories corresponding to the one tab.

19. A computing device as recited in claim 17, wherein the change to the multiple toolbar buttons comprises a change to a border around one of the multiple toolbar buttons to identify an alert regarding the one toolbar button.

20. A computing device as recited in claim 17, wherein the multiple toolbar buttons to be included in the toolbar are based, at least in part, on buttons associated with web browser applications already configured to display on the device.

* * * * *